United States Patent
Yi et al.

(10) Patent No.: US 9,832,659 B2
(45) Date of Patent: Nov. 28, 2017

(54) METHOD AND APPARATUS FOR SUPPORTING CONTROL PLANE AND USER PLANE IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/649,148

(22) PCT Filed: Dec. 3, 2013

(86) PCT No.: PCT/KR2013/011123
§ 371 (c)(1),
(2) Date: Jun. 2, 2015

(87) PCT Pub. No.: WO2014/088295
PCT Pub. Date: Jun. 12, 2014

(65) Prior Publication Data
US 2015/0312775 A1     Oct. 29, 2015

Related U.S. Application Data

(60) Provisional application No. 61/818,901, filed on May 2, 2013, provisional application No. 61/732,878, filed on Dec. 3, 2012.

(51) Int. Cl.
*H04W 16/24* (2009.01)
*H04W 36/36* (2009.01)
(Continued)

(52) U.S. Cl.
CPC .......... *H04W 16/32* (2013.01); *H04W 16/00* (2013.01); *H04W 36/00* (2013.01);
(Continued)

(58) Field of Classification Search
None
See application file for complete search history.

(56) References Cited

U.S. PATENT DOCUMENTS

2006/0033746 A1 * 2/2006 Ogura ................... H04W 92/12
345/570
2010/0091654 A1 * 4/2010 Ohno .................... H04W 36/02
370/235

(Continued)

FOREIGN PATENT DOCUMENTS

| | | |
|---|---|---|
| EP | 2 306 781 A1 | 4/2011 |
| EP | 2 381 733 A2 | 10/2011 |
| KR | 10-2011-0046231 A | 5/2011 |

*Primary Examiner* — Duc Duong
(74) *Attorney, Agent, or Firm* — Birch, Stewart, Kolasch & Birch, LLP

(57) ABSTRACT

A method for and apparatus for supporting a control plane (C-plane) and a user plane (U-plane) in a wireless communication system supporting multiple carriers is provided. A wireless device configures a cell for the U-plane to receive and transmit data, determines to enable a User Plane Reception Period (U-RP) corresponding to the cell for the U-plane, and determines to receive and transmit data with the cell for the U-plane during the enabled U-RP. The cell for the U-plane includes at least one or more serving cells, and the cell for the U-plane has a different frequency from a cell for the C-plane.

14 Claims, 10 Drawing Sheets

(51) Int. Cl.
*H04W 16/32* (2009.01)
*H04W 36/00* (2009.01)
*H04W 76/04* (2009.01)
*H04W 16/00* (2009.01)
*H04W 72/04* (2009.01)
*H04W 84/04* (2009.01)

(52) U.S. Cl.
CPC ..... *H04W 72/0446* (2013.01); *H04W 76/048* (2013.01); *H04W 84/045* (2013.01)

(56) References Cited

U.S. PATENT DOCUMENTS

| | | | |
|---|---|---|---|
| 2012/0176955 A1* | 7/2012 | Ishii | H04W 72/042 370/315 |
| 2012/0201162 A1 | 8/2012 | Kim et al. | |
| 2012/0257581 A1 | 10/2012 | De | |
| 2013/0260811 A1* | 10/2013 | Rayavarapu | H04W 76/028 455/509 |
| 2014/0029448 A1* | 1/2014 | Balachandran | H04J 11/0059 370/252 |
| 2014/0084486 A1* | 3/2014 | Zhang | H01L 21/31127 257/774 |
| 2014/0321371 A1* | 10/2014 | Anderson | H04W 76/028 370/329 |

* cited by examiner

[Fig. 1]
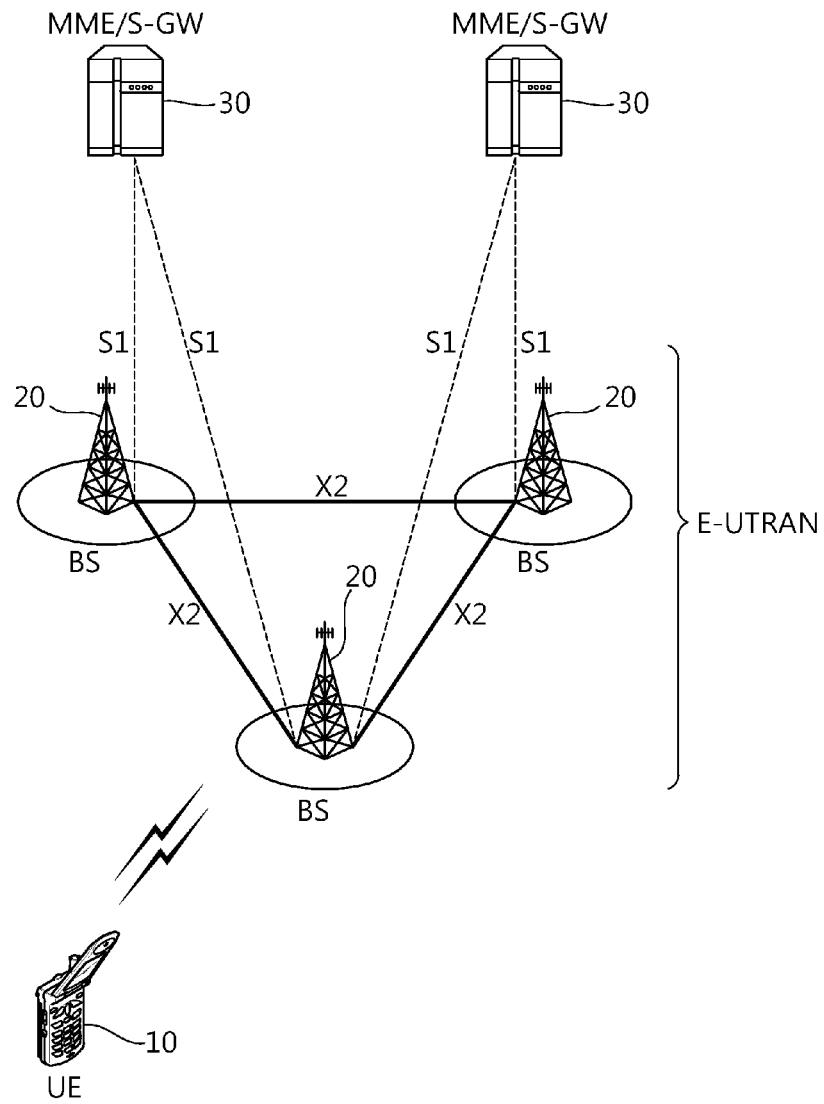
[Fig. 2]
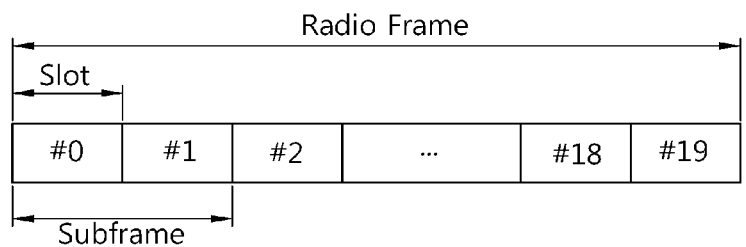

[Fig. 3]
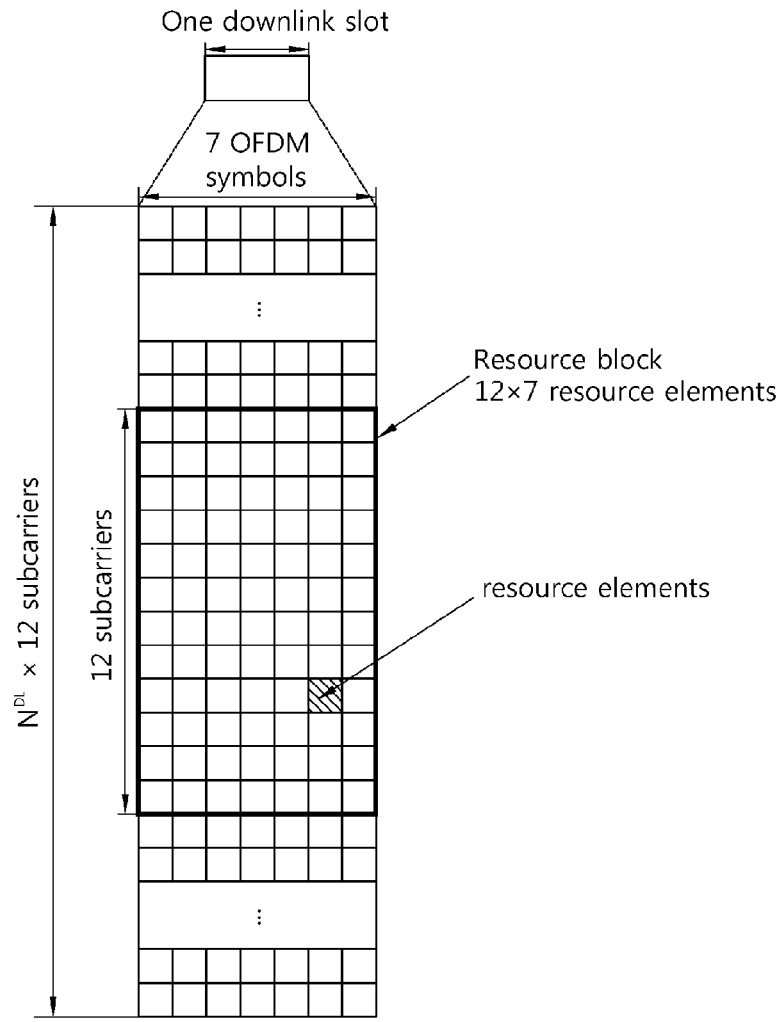
[Fig. 4]
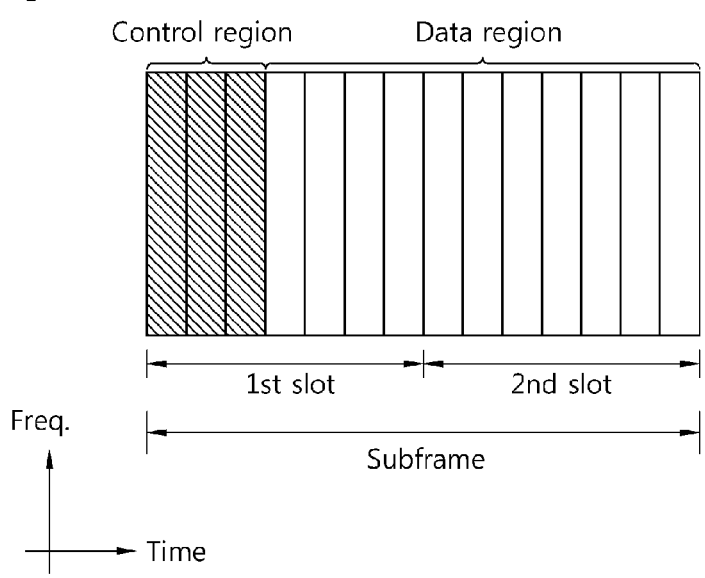

[Fig. 5]
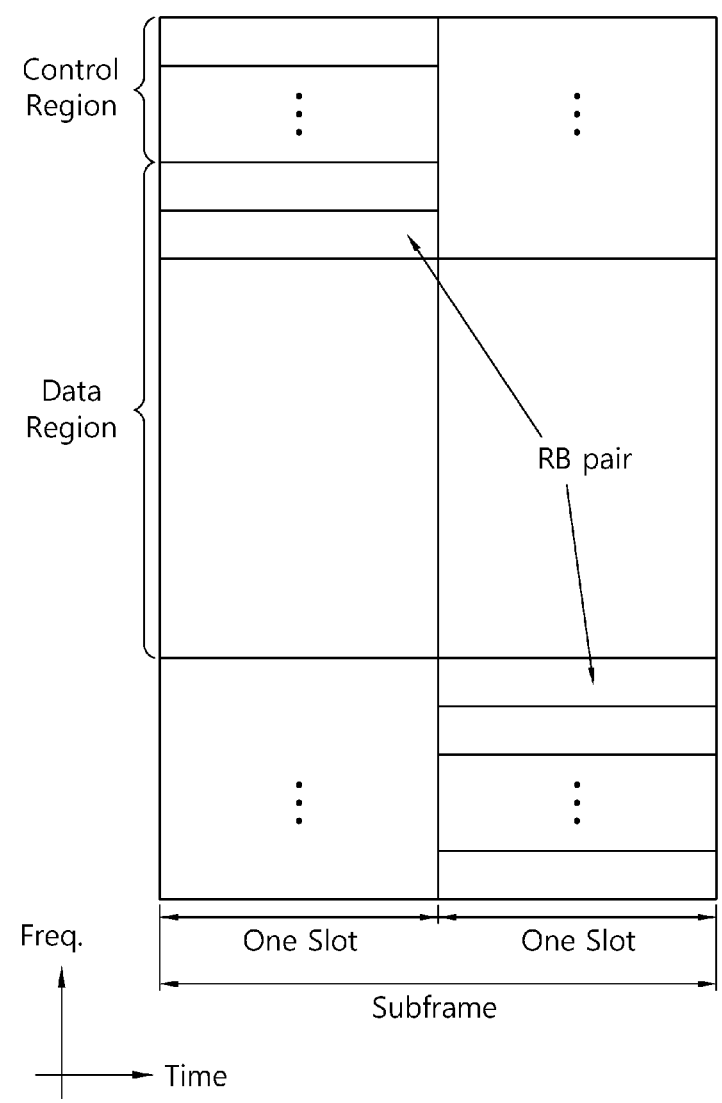

[Fig. 6]
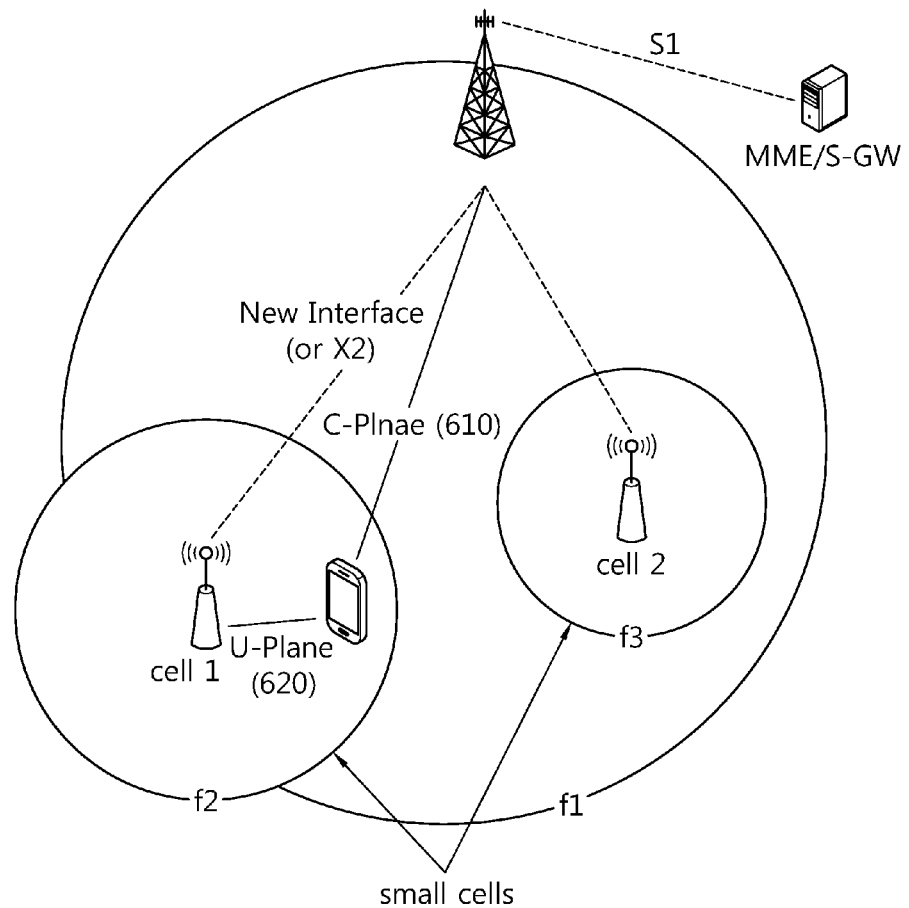
[Fig. 7]
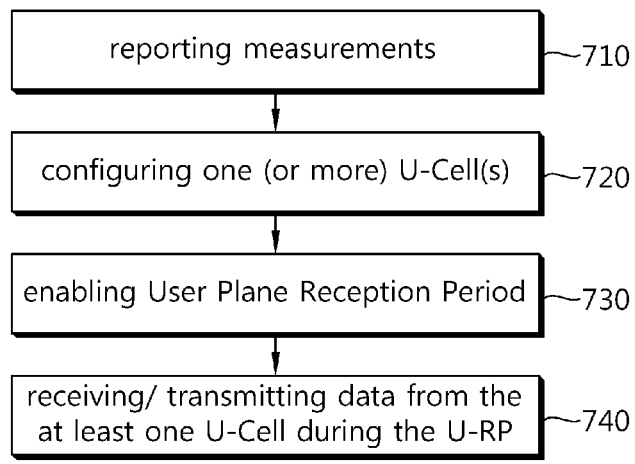

[Fig. 8]
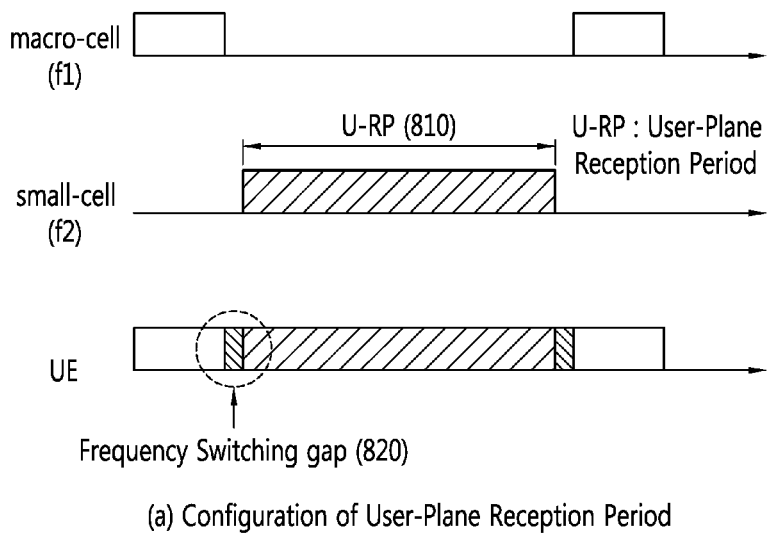
(a) Configuration of User-Plane Reception Period
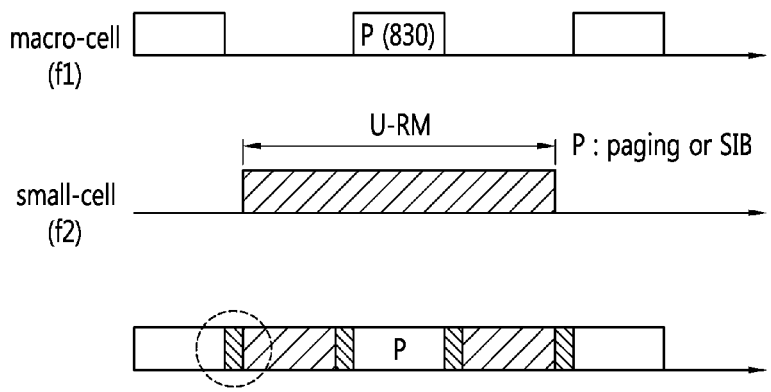
(b) Reception from C-Plane While in U-RP

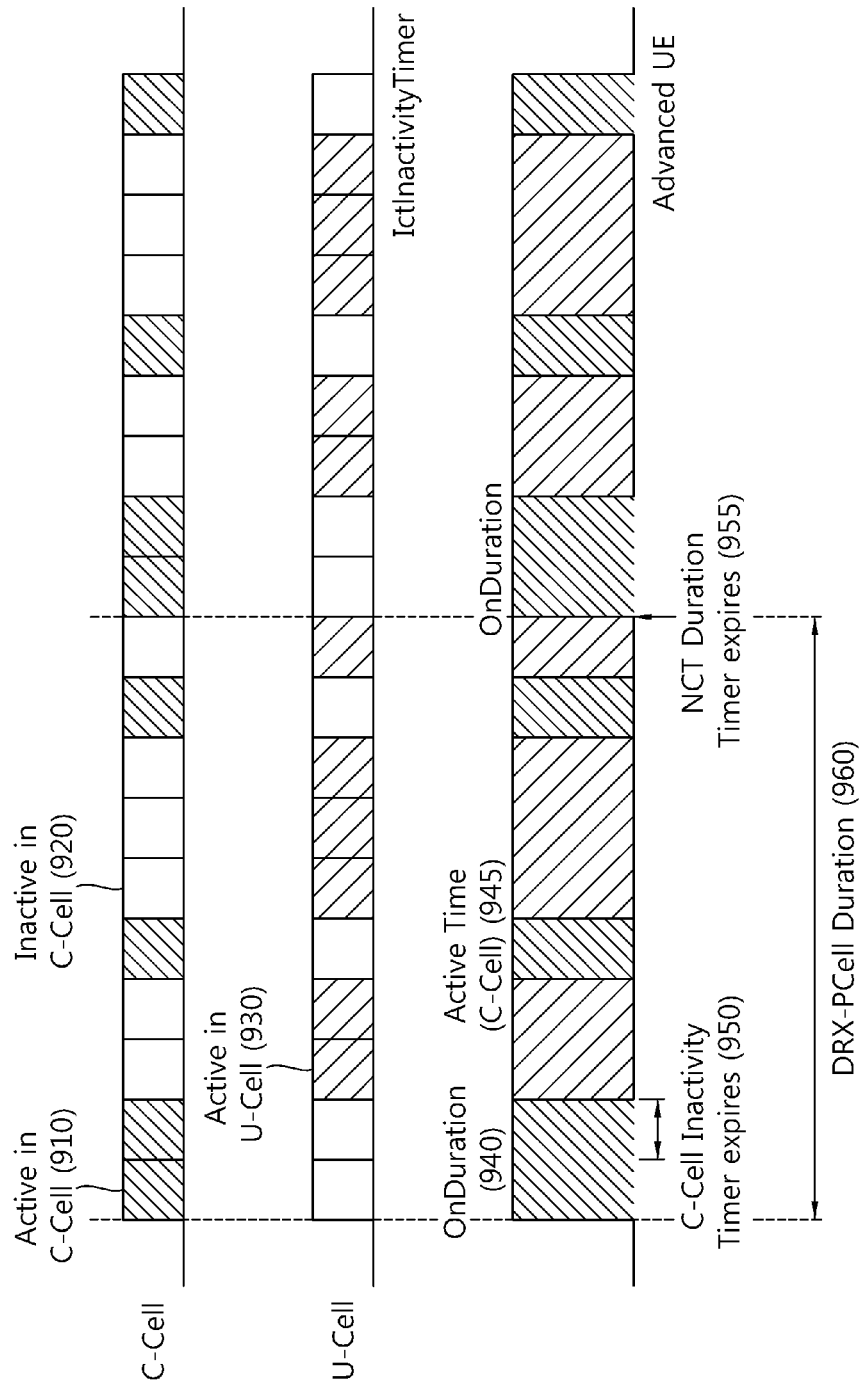
[Fig. 9]

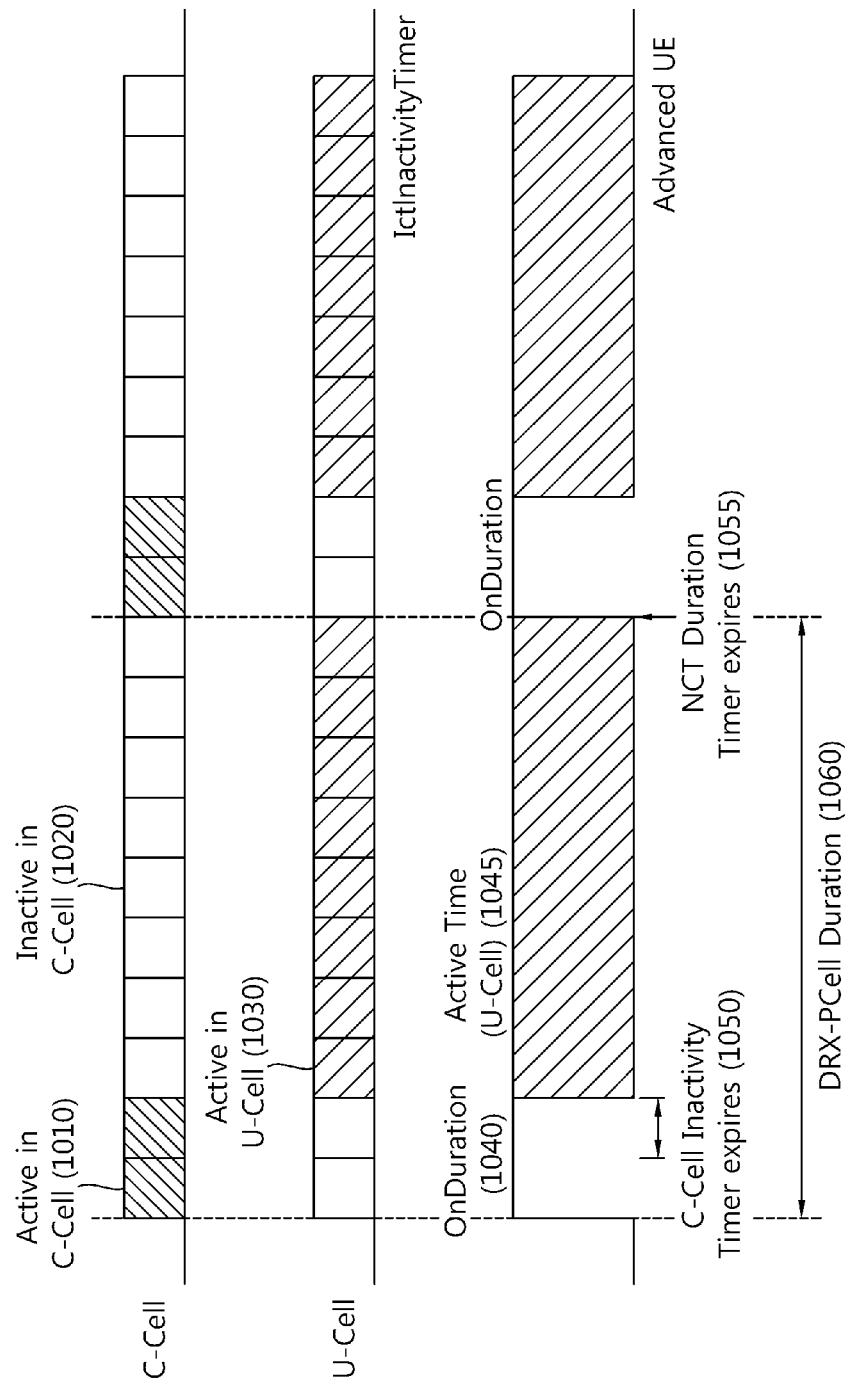
[Fig. 10]

[Fig. 11]
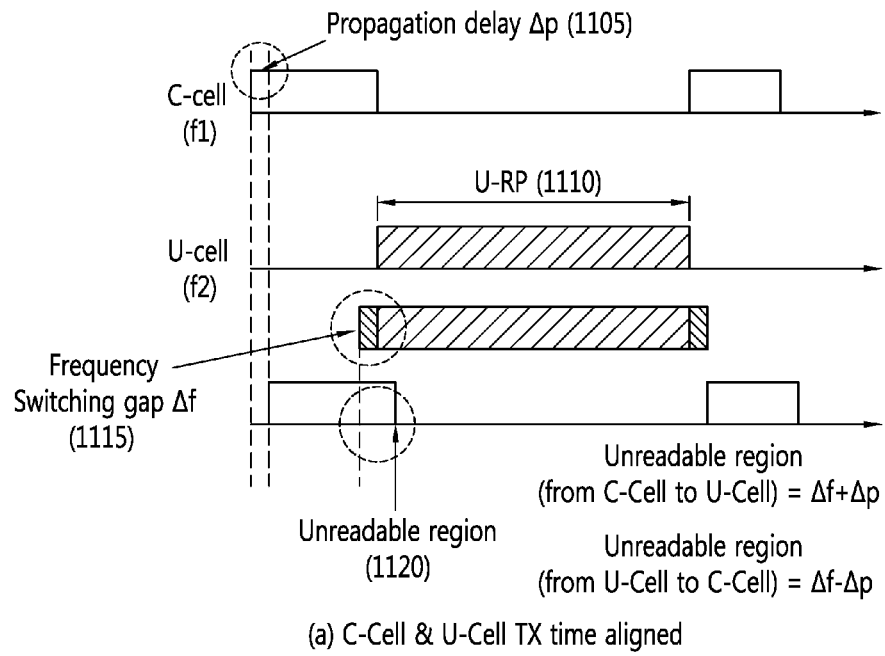
(a) C-Cell & U-Cell TX time aligned
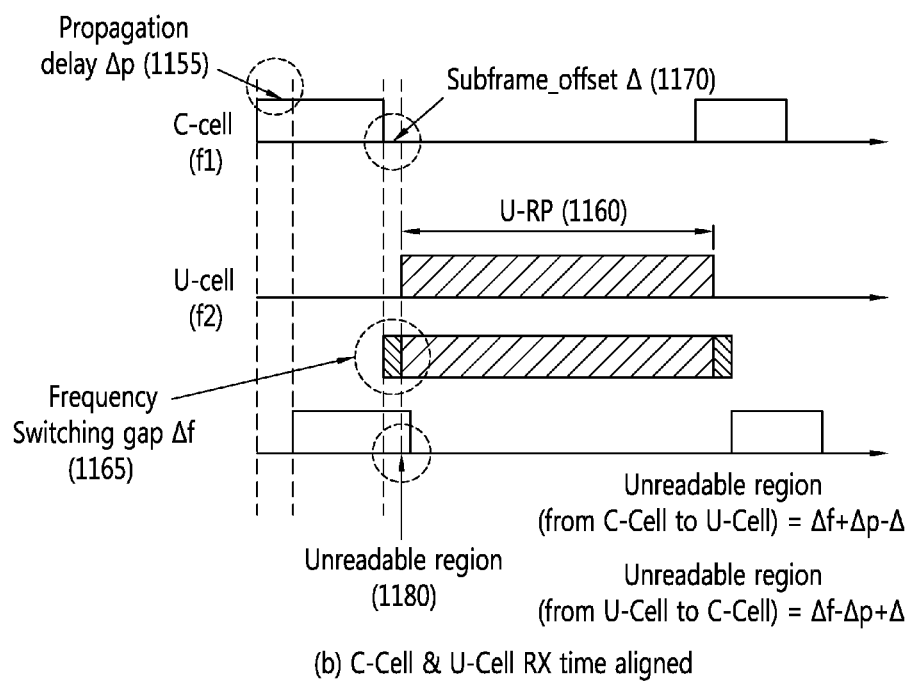
(b) C-Cell & U-Cell RX time aligned

[Fig. 12]
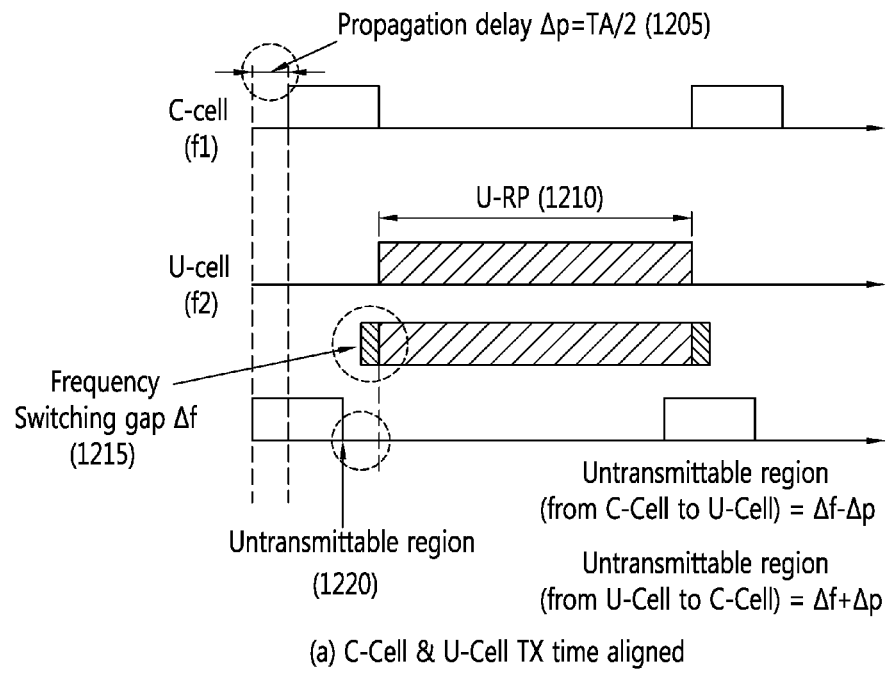
(a) C-Cell & U-Cell TX time aligned
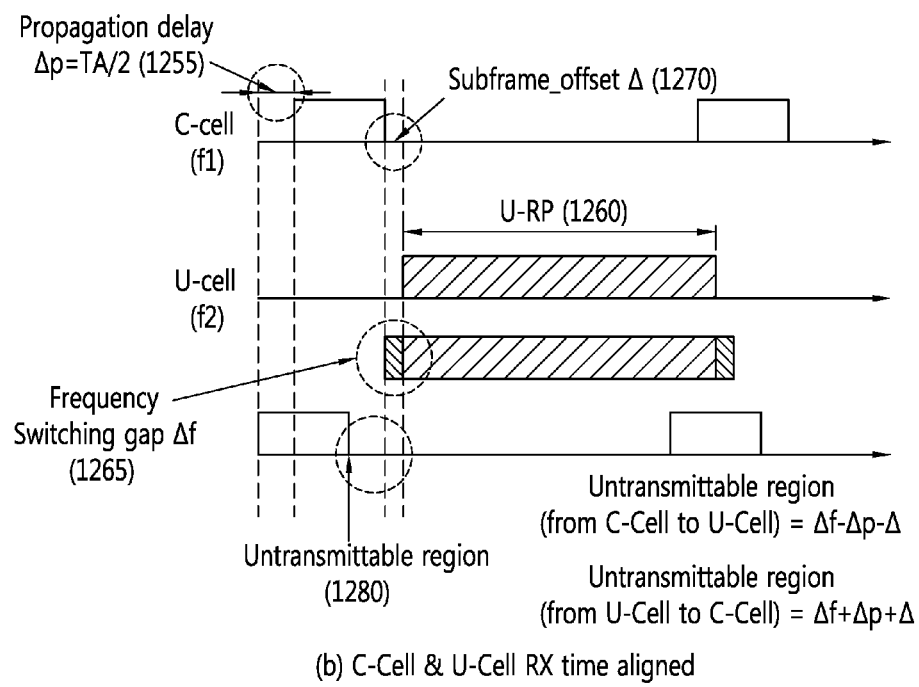
(b) C-Cell & U-Cell RX time aligned

[Fig. 13]
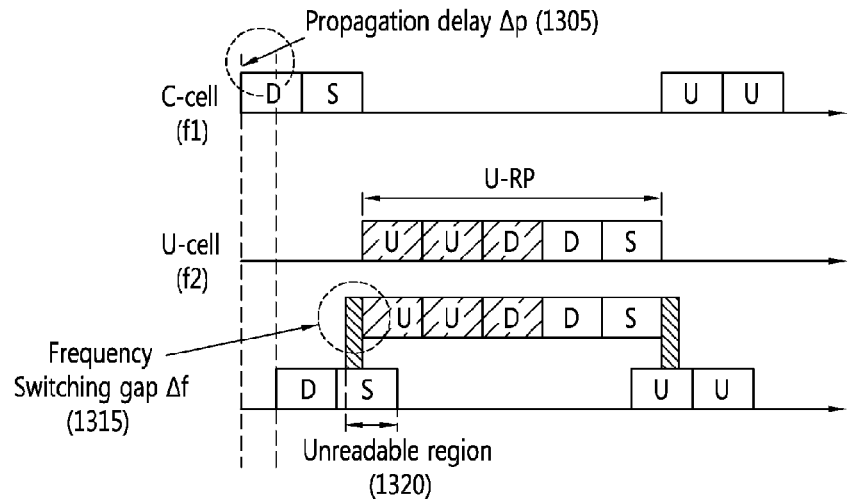
(a) Transit at Uplink Subframe of U-Cell
[Fig. 14]
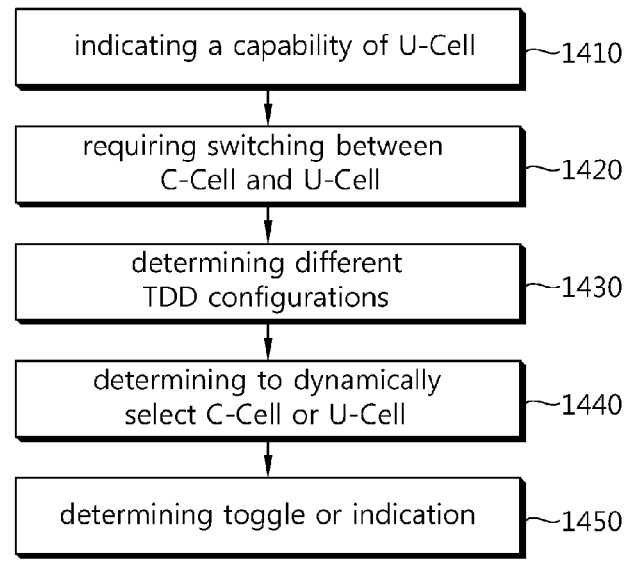
[Fig. 15]
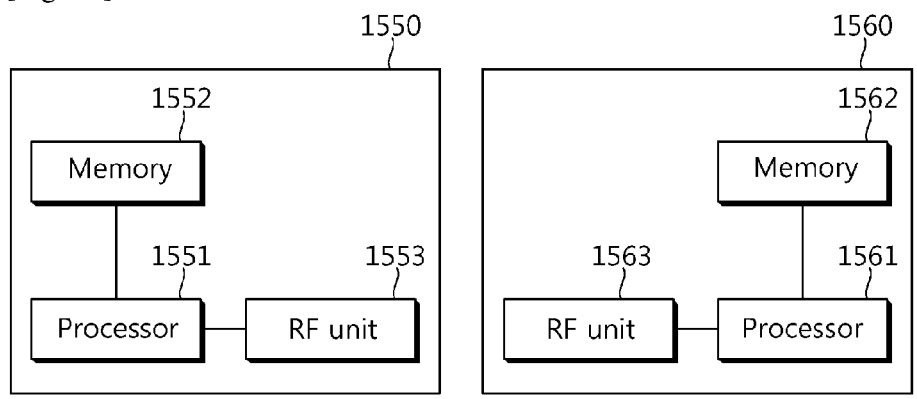

METHOD AND APPARATUS FOR SUPPORTING CONTROL PLANE AND USER PLANE IN WIRELESS COMMUNICATION SYSTEM

CROSS REFERENCE TO RELATED APPLICATIONS

This application is the National Phase of PCT International Application No. PCT/KR2013/011123, filed on Dec. 3, 2013, which claims priority under 35 U.S.C. 119(e) to U.S. Provisional Application Nos. 61/818,901, filed on May 2, 2013 and 61/732,878, filed on Dec. 3, 2012, all of which are hereby expressly incorporated by reference into the present application.

TECHNICAL FIELD

The present invention relates to wireless communications, and more particularly, to a method and apparatus for supporting a control plane (C-plane) and a user plane (U-plane) in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted (or eliminated) controls and new reference signals needs to be defined.

DISCLOSURE OF INVENTION

Technical Problem

The present invention provides a method and apparatus for supporting a control plane (C-plane) and a user plane (U-plane) in a wireless communication system supporting multiple carriers.

The present invention also provides a method and apparatus for supporting an anchor carrier and a dependent carrier in a wireless communication system supporting multiple carriers.

The present invention also provides a method and apparatus for supporting a dual connectivity over potentially multiple eNBs in a wireless communication system supporting multiple carriers.

The present invention also provides a method and apparatus for transmitting data with cell planning for a load balance in a wireless communication system supporting multiple carriers.

The present invention also provides a method and apparatus for handling a control plane (C-plane) and a user plane (U-plane) split for non-CA capable UEs in a wireless communication system supporting multiple carriers.

Solution to Problem

In an aspect, a method for supporting a control plane (C-plane) and a user plane (U-plane) in a wireless communication system supporting multiple carriers is provided. The method may include configuring a cell for the U-plane to receive and/or transmit data, determining to enable a User Plane Reception Period (U-RP) corresponding to the cell for the U-plane, and determining to receive and/or transmit data with the cell for the U-plane during the enabled U-RP, wherein the cell for the U-plane includes at least one or more serving cells.

The method may further include performing one of attaching to the cell for the U-plane via a hand-over procedure, a serving cell (SCell) configuration, an activation/deactivation of the SCell, and configuring a Discontinuous Reception (DRX) configuration to listen frequency for the cell for the U-plane.

The method may further include configuring a cell of an anchor carrier, and configuring a cell of a dependent carrier on the anchor carrier, wherein the anchor carrier and the dependent carrier are set for supporting a U-Plane functionality.

The method may further include indicating a capability with one or more frequencies for the U-plane to a serving cell, requesting to switch between a cell for the C-plane and a cell for the U-plane, and determining one of that a different configuration for each of the cells is configured, a dynamic selection is indicated, and a toggle or indication for switching is used, wherein the cell for the U-plane includes at least one or more serving cells, and the cell for the U-plane has a different frequency from the cell for the C-plane.

In another aspect, a wireless device for supporting a control plane (C-plane) and a user plane (U-plane) in a wireless communication system supporting multiple carriers is provided. The wireless device includes a radio frequency unit for receiving a radio signal; and a processor, operatively coupled with the radio frequency unit, configured to configure a cell for the U-plane to receive and transmit data, determine to enable a User Plane Reception Period (U-RP) corresponding to the cell for the U-plane, and determine to receive and transmit data with the cell for the U-plane during the enabled U-RP, wherein the cell for the U-plane includes at least one or more serving cells, and the cell for the U-plane has a different frequency from a cell for the C-plane.

Advantageous Effects of Invention

This invention provides an enhanced communication system including a new form of a carrier (or cell) to improve interference problems between pluralities of cells. Also this invention provides that at least two serving cells with different coverage can be used for data transmission. More details, this invention can include cells that each is a C-Plane and a U-Plane are split over different carriers, for example, the C-Plane is over a macro cell layer, and the U-Plane is over a small cell layer, and the macro and the small of cells may not be in co-site. This invention may allow better offload and user throughput, Quality of Experience (QoE) on UEs particularly in cell-edge and carrier extensibility as well. By supporting a UE has limited transmission/reception capability such as single TX and RX capability, inter-node resource aggregation can be realized in more UEs. Thus, more efficient and less expensive cell planning and data scheduling are supported in this invention.

BRIEF DESCRIPTION OF DRAWINGS

FIG. 1 shows a wireless communication system to which the present invention is applied.

FIG. 2 shows a structure of a radio frame to which the present invention is applied.

FIG. 3 is an exemplary diagram showing a resource grid for one downlink slot to which the present invention is applied.

FIG. 4 shows a structure of a downlink subframe to which the present invention is applied.

FIG. 5 shows an example of a structure of an uplink subframe carrying an ACK/NACK signal to which the present invention is applied.

FIG. 6 shows an example of concept for a control plane (C-plane) and a user plane (U-plane) split which the present invention is applied.

FIG. 7 shows an example of concept for configuring U-Cell(s) according to an exemplary embodiment of the present invention.

FIG. 8 shows an exemplary time flow for data reception according to an exemplary embodiment of the present invention.

FIG. 9 and FIG. 10 show an example of DRX operation of C-Plane/U-Plane split structure according to an exemplary embodiment of the present invention.

FIG. 11 and FIG. 12 show an example of FDD Downlink Gap calculation according to an exemplary embodiment of the present invention.

FIG. 13 shows an example of TDD handling according to an exemplary embodiment of the present invention.

FIG. 14 shows an exemplary flow chart of UE according to an exemplary embodiment of the present invention.

FIG. 15 shows a block diagram showing a wireless communication system according to an exemplary embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply withe changeable manners to a corresponding system.

FIG. 3 is an exemplary diagram showing a resource grid for one downlink slot to which the present invention is applied.

Referring to FIG. 3, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
| --- | --- | --- | --- |
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

FIG. 4 shows a structure of a downlink subframe to which the present invention is applied.

Referring to FIG. 4, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
| --- | --- |
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |

TABLE 2-continued

| DCI format | Description |
|---|---|
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

-Carrier indicator-0 or 3 bits
-Flag for identifying Format 0/Format 1A-1 bit, 0 indicates Format 0, 1 indicates Format 1A.
-Frequency hopping flag-1 bit, is a Most Significant Bit (MSB) corresponding to resource allocation at need and used to assign multiple clusters.
-Resource block assignment and hopping resource allocation-$|\log_2(N_{RB}^{UL}(N_{RB}^{UL} + 1)/2)|$ bits
  -PUSCH hopping (corresponding to only single cluster assignment):
    -$N_{UL\_hop}$ MSBs are used to obtain an $n_{PRB}(i)$ value.
    -$(|\log_2(N_{RB}^{UL}(N_{RB}^{UL} + 1)/2)| - N_{UL\_hop})$ bits provide the resource allocation of the first
slot of an uplink subframe.
  -In single cluster assignment, non-hopping PUSCH
    -$(|\log_2(N_{RB}^{UL}(N_{RB}^{UL} + 1)/2)|)$ bits provide the resource allocation of an uplink subframe.
  -In multi-cluster assignment, non-hopping PUSCH: Resource assignment is obtained
from a combination of a frequency hopping flag field and a resource block assignment and
hopping resource allocation field.

$$\left\lceil \log_2\left(\left(\frac{\lceil N_{RB}^{UL}/p + 1 \rceil}{4}\right)\right)\right\rceil$$

bits provide resource allocation in an uplink subframe.
  Wherein, P depends on the number of downlink resource blocks.
-Modulation and coding scheme/redundancy version-5 bits
-New data indicator-1 bit
-TPC command for a scheduled PUSCH-2 bits
-Cyclic shift and OCC index for DM RS-3 bits
-Uplink index-2 bits, only exist for a TDD operation, that is, an uplink-downlink configuration 0
-Dowlink Assignment Index (DAI)-2 bits, only exist for TDD operations, that is, uplink-downlink configurations 1-6
-CQI request-1 or 2 bits, a 2 bit field is applied to a UE configured using at least one downlink cell.
-SRS request-0 or 1 bit.
-Multi-cluster flag-1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and system information RNTI (SI-RNTI) may be masked to the CRC. To indicate a random access response that is a response for transmission of a random access preamble of the UE, a random access-RNTI (RA-RNTI) may be masked to the CRC.

FIG. 5 is a view illustrating an example of a structure of an uplink subframe carrying an ACK/NACK signal to which the present invention is applied.

Referring to FIG. 5, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

FIG. 6 shows an exemplary concept for supporting a control plane (C-plane) and user plane (U-plane) split according to an exemplary embodiment of the present invention.

Referring to FIG. 6, the development of wireless communication technology, a macro cell, a femto cell, a pico cell, etc. are used in heterogeneous network environment. As compared with a macro cell, a femto cell or a pico cell, that is a system that covers an area smaller than the existing mobile communication service radius. In addition to straightforward densification of a macro deployment, network densification can be achieved by the deployment of complementary low-power nodes under the coverage of an existing macro-node layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low power nodes can also be referred to as providing local-area access, in contrast to the wide-area-covering macro layer. The installation of low-power nodes as well as heterogeneous deployments has been possible.

An extending the capabilities to operate in heterogeneous deployments are added to the LTE system, the macro and low-power layers, including different forms of macro assistance to the low-power layer and dual-layer connectivity. Meanwhile, a Dual connectivity implies that the device or mobile (UE) has simultaneous connections to both macro and low-power layers. The Dual connectivity may imply Control and Data separation where, for instance, the control signaling for mobility is provided via the macro layer at the same time as high-speed data connectivity is provided via the low power layer as the small cell. A separation between downlink and uplink, the downlink and uplink connectivity is provided via different layers.

An UE of the present invention can support service via the macro cell having a frequency band of f1 to transmit and receive data transmission in Uplink/Downlink, and also the UE can support service via the small cell having a frequency band of f2 or f3 to transmit and receive data transmission in Uplink/Downlink, the f1 and f2 (f3) can be included same or different frequencies. That is, the UE can use the macro cell and the small cell simultaneously to supporting the Dual connectivity, it is also included that a radio link between the UE and the macro cell (macro eNB) and a radio link between the UE and the small cell (small eNB) is established respectively. Therefore, the control for the radio link each can be needed. Herein the macro cell and the small cell, for instance, a radio interface protocol between the UE and each cell eNB can be classified into a first layer (L1), a second layer (L2), and a third layer (L3) based on three layers of the OSI in the communication system. For example, the macro eNB includes PDCP, RLC, MAC and PHY layer and the small eNB may include RLC, MAC and PHY layer, optionally PDCP layer is included. Herein the PDCP layer of the macro cell can be connected RLC layer of the small cell via the Xa (interface protocol), the Xa interface can be a X2 interface in LTE system. An EPS bearer each is established to provide service by establishing RB with the macro eNB and the small eNB each to UE.

Especially, this invention describes that a C-Plane and a U-Plane split over different carriers are existed. More particularly, a U-Plane discovery enhancement, system information delivery in a U-Plane, co-channel scenario, and large system bandwidth handlings are shown in this invention. For benefits of the invention, there is a C-Plane and a U-Plane split over different carriers which may be intra-eNB or inter-eNB, the most promising scenario would be that a C-Plane is over macro cell layer, and a U-Plane is over small cell layer so that it may keep the benefit of macro coverage in terms of hand-over and coverage, boost data throughput by localizing data transmission, and offload heavy load from macro-cell. Therefore, it can offer better Quality of Experience (QoE) on UEs in particular cell-edge UEs.

In FIG. 6, a few options are addressed that a UE which is non-CA capable yet, the network wants to configure a C-Plane and a U-Plane split for the UE by time-division multiplexing approach. Motivation of the invention may include that efficient small cell offloading should handle UE mobility issue such as preventing frequent hand-over and a Dual connectivity of splitting a C-Plane and a U-Plane are considered. In this invention provides how to support the dual connectivity without increasing UE H/W complexity and thus this invention provides the dual connectivity to UE's regardless of CA-capability. Herein, the C-Plane functions may be supported with limited UE active time. The UE is reachable to both macro cell and small cell (i.e. cell 1), and the macro cell wants to configure a UE with a U-Plane via cell 1(f2) and a C-Plane via a macro cell (f1), this invention discusses a few alternative approaches to enable this scenario. Particularly, this invention assumes focuses on the case that frequency for macro cell and small cells are different. It is assumed that if the macro and small cell(s) are co-channel deployed, a CoMP can be used for a C-Plane and a U-Plane split. However, with non-ideal backhaul co-channel case, this technique can be still applied. For the convenience, a C-Plane cell can be called as a C-Cell and a U-Plane cell can be called as a U-Cell.

FIG. 7 shows an example of concept for configuring U-Cell(s) according to an exemplary embodiment of the present invention.

Referring to FIG. 7, Based on inter-frequency or intra-frequency measurement from a UE, the serving cell as C-Cell can identify one or more candidate small cell(s) for U-Plane split. That is, the UE performs the measurement and report measurement results to configure a small cell(s) for U-Plane split (710). Once, a candidate cell is identified and potentially data off-loading is necessary, the serving cell may configure U-Cell for User Plane Cell which a UE can receive and transmit data from and to once User Plane Reception Period (U-RP) is enabled. Note that U-RP may be configured only for transmission where a UE may be able to perform multiple reception (e.g., 2 RX) whereas single transmission is possible at a time (e.g., 1 TX). In this case, separate period configuration for reception may not be necessary. Thus, configuration of U-RP may be applied only for transmission whereas reception can be performed in parallel from both macro and small cell layers. For this, the UE determines a Scell configuration from the serving Cell by receiving one of a RRC signal, a MAC signal and a PHY signal, so that the UE may configure one or more U-Cells for User Plane Cell to receive and transmit data from and to the one or more U-Cells (720). After this, the UE may receive an indication of the U-RP enabling from the serving Cell, the indication may set a bit to indicate U-RP enabling (1) or disabling (0) with reserved bit in a PDCCH or ePDCCH, or the indication may signaled by a MAC signal associated with a activation/deactivation information of corresponding to a U-Cell, Or when the U-Cell is configured to the UE, the indication may set as default with time information including a strat subframe and an end subframe with DRX configuration information, herein the time information also include offset value which is interworking with the DRX configuration for the UE (730). Therefore, the UE may receive and transmit data from the U-Cell during the enabled U-RP (740).

For more details, the configuration and the enabling is descried as below, the configuration of a U-Cell consists of U-RNTI (User RNTI) which is used for activation/deactivation of the U-RP for the configured U-Cell. It may be used as a C-RNTI by the U-Cell. If it is not given by higher layer, the UE shall assume the same C-RNTI used in C-Cell will be used in U-Cell as well. The Cell ID is included in the configuration, the Cell ID includes the target cell ID including a global cell ID, and the cell ID may be physical cell ID or a virtual cell ID. The cell ID further includes an ID to read any cell-specific RS such as tracking RS, discovery signal, CSI-RS. And Center frequency and System bandwidth in the configuration include the center frequency and the system bandwidth of the target cell. The System information is signaled as SIB1/2 of the target cell or higher layer signaling so that the UE shall know; the System information may be different from the serving cell.

If different from serving cell's SFN is assigned, a separate SFN is sent in system information signaling. A CSI-RS configuration for target cell is configured to enable CSI measurement on the target cell, the CSI-RS configuration information is transmitted as well. ePDCCH subframe monitoring information or ePDCCH set(s) configuration is configured if both PDCCH and ePDCCH are supported. ePDCCH CSS related information such as scrambling sequence, etc can be also configured if ePDCCH CSS is supported. If necessary RS decoding related information such as V-shift or Tracking RS offset/period/sub-band width, antenna port # for CRS, DM-RS pattern is signaled. Discovery/measurement signal information on U-Cell can be also transmitted for UE measurement. For TDD, D/U configuration of U-Cell can be configured. If dynamic TDD is configured, D/U configuration of U-Cell along with optionally starting and end subframe numbers is configured which may be propagated periodically.

This configuration can be done via higher-layer signaling. Even though the example shows only one U-Cell configuration, a UE also can be configured with multiple U-Cell configurations. Other approaches to configure U-Cell can be applied as following procedures.

Hand-over RRC_Connected UE to U-Cell can be configured, that is, the UE is attached to the U-Cell via hand-over procedure. Necessary information for hand-over is given by macro cell. The UE is hand-over to the macro cell back either UE changes its state to RRC_Idle mode or RLF occurs. To monitor the macro cell, the U-Cell can configure a separate inter-frequency measurement gap to measure macro cell quality. Another approach is to configure U-Cell as if a SCell where a UE is configured with macro and small cell layer simultaneously. However, a UE is served by either one at a given time. In this case, SCell configuration and also activation/deactivation procedure can be used for configuring U-Cell and activate/deactivate U-Cell. Furthermore, DRX-like operation is also feasible where a UE is configured with DRX, it may assume that a preconfigured U-Cell becomes active in 'DRX cycles' To help to understand this, this invention uses FIG. 8.

The FIG. 8 shows an exemplary time flow of configuring a U-Cell for data reception according to an exemplary embodiment of the present invention.

Referring to FIG. 8, the UE configures the macro cell with f1, and small cell with f2 to receive and transmit data during the U-RP (810), the frequency measurement gap (820) is set for measuring the macro cell's strength as described (b). As C-Plane and U-Plane are operating at different frequency, herein the operating band may be the same, the UE needs to switch frequencies for C-Plane and U-Plane in TDM fashion. To allow a gap for frequency switching, a gap called as Frequency Switching Gap needs to be defined from macro cell to the small cell transfer. Moreover, as described in (b) 830, a inter-frequency measurement gap-like pattern can be configured for a UE to monitor macro-cell quality and perform necessary synchronization to switch fast back to macro-cell when U-Cell quality becomes poor or U-Cell becomes congested.

A Paging in U-Cell may be transmitted via UE-specific PDSCH so that the Paging using P-RNTI on RRC_Connected mode may not be expected. When a UE fall-backs to the macro cell, paging can be received by the macro cell as described (b). Note that 830 in (b) can be used for any reception from macro-cell and/or measurement on macro-cell. That is, the UE can check the frequency measurement gap to measure the macro cell's strength and receive paging according to the DTX configuration or SIB (830) from the macro cell while communicating data with small cell via f2 during the U-RP. For a better fallback, the UE can store the information about macro cell before hand-over because the macro cell is set to have the highest priority when UE needs to be hand-over due to RRC_Idle or RLF.

Alternatively, this procedure may be used when a UE is configured with U-Cell either via SCell configuration procedure or DRX procedure or other means such as RRC diversity or dual connectivity where a UE maintains two connections to both macro and small cells simultaneously. Hand-over used here is an example. Actual procedure used to configured U-Cell may depend on other procedures such as SCell configuration or dual connectivity to support UE mobility handling by macro-cell.

Either, DRX-like approach can be configured as configuring a U-Cell. Another approach is to configure a DRX-PCell which is similar to current DRX mechanism. Only difference is that UE in DRX-PCell listens to U-Cell frequency where uplink transmission can be associated with U-Cell uplink. Also, the duration of DRX-PCell can be longer than regular DRX such as {100 msec, 400 msec, 1 s, 2 s, 5 s, 10 s, 100 s, 1000 s, 2000 s, 5000 s, 10000 s}. Similar to DRX, when a UE is in DRX-PCell, the UE listens or transmits in U-Cell frequency and switches to the C-Cell frequency and listens whether the C-Cell has any data. If the C-Cell has data, it shall listen to the C-Cell until Inactivity timer expires. Inactivity timer for the DRX-PCell can be different values such as {10 msec, 20 msec, 40 msec, 80 msec}. Similar to DRX, the DRX-PCell can have a short DRX-PCell cycle and a long DRX-PCell cycle where the long DRX-PCell cycle can be much longer than short DRX-PCell such as long DRX-PCell=k*short DRX-PCell cycle where k>=2.

In terms of adding U-Cell, the DRX configuration with information about the U-Cell listed above can be used. Or, the U-Cell configuration can be performed and activation can be enabled by DRX-like scheme. Refer an example of configuration of U-Cell in following FIGS. 9 and 10. Without loss of generality, the techniques proposed here can be applied to UE with multiple TX/RX capabilities to configure multi-carriers which would be more than the maximum simultaneous TX/RX capabilities. For example, if a UE supports two CC CA for both downlink and uplink, to configure more than 3 CCs, this technique can be used. In this case, there could be an anchor CC and dependent CC (similar to C-Cell and U-Cell mentioned in this invention) where a UE is configured with dependent CC where a UE will be fall-back to the anchor CC when dependent CC quality becomes poor or follow a configured pattern. Following FIG. 9 illustrates an example DRX configuration. Similarly, when there is a DTX configuration where an anchor CC performs cell on/off and a DTX pattern can be configured, a UE may switch between anchor CC and dependent CC following DTX pattern as well. For example, when anchor cell is off-state, the UE switches to dependent CC to get services. Another example would be that dependent carrier is unlicensed band (LTE-U) such that dependent carrier is not available when primary users are present (e.g., ISM-band users, Wi-Fi users). Thus, to support LTE-U carrier, having one more RX/TX capability would not be so efficient and then LTE-U carrier can perform as a dependent carrier for an anchor carrier which will configure/control UE to switch between two carriers to maximize user throughput.

FIG. 9 and FIG. 10 shows an example of DRX configuration of C-Plane and U-Plane split structure which the present invention is applied.

A UE can be configured to switch back to C-Cell on paging cycle or other signals that UE is expected to receive in DRX mode as UE is in DRX cycle from PCell perspective as shown FIG. 9. In FIG. 9, the UE is configured to the C-Cell with DRX functionality by a RRC signaling, including onDurationTimer, drx-InactivityTimer, drx-RetransmissionTimer, drxStartOffset, and optionally shortDRX-cycle, drxShortCycleTimer for a DRX operation. When the UE is configured with the DRX functionality that the short DRX Cycle is configured, the UE uses the short DRX Cycle and the UE starts the drxShortCycleTimer. If the short DRX Cycle is not configured, the UE uses the long DRX Cycle. Especially, the UE uses DRX-PCell configuration which that the UE in DRX-PCell listens to U-Cell frequency where uplink transmission can be associated with U-Cell uplink.

In other words, the UE controls active time that the onDurationTimer control to run at specific subframe using the drxStartOffset and the applied DRX cycle and the C-Cell Inactivity Timer (950) and new cell OnDuration (955). Herein the active time of the UE is calculated with DRX configuration as the DRX-PCell configuration in this invention including an Active time in C-Cell (910) and Inactive time in C-Cell (920) and Active in U-Cell (930). The UE starts OnDuration (940) with the DRX configuration and checks to monitor a paging (945) from the C-Cell during the U-RP which is a pending period to communicate the U-Cell (930). The OnDuration of the UE (960) which is configured the C-Cell and U-cell(s) is set by the drx-InactivityTimer, especially, the drx-InactivityTimer in this invention more includes a C-Cell InactivityTimer and a new Cell corresponding to a U-Cell(s) Duration timer.

Meanwhile, the UE determines that the onDurationtimer with the DRX-PCell Duration which is in active as a running state and the UE stops the running onDurationTimer to save UE power more efficient. It is described in FIG. 10. That is, alternatively, the UE can be configured not to monitor paging or other signals that UE is expected to receive in DRX mode on DRX-PCell duration as shown FIG. 10. Therefore, the UE save the power to switch back to the C-Cell for the paging cycle or other signals and focuses on the U-Cell frequency for the uplink transmission (1045) as the Active in U-Cell (1030).

Furthermore, Dynamic selection can be applied in this invention. Assuming an inter-frequency measurement gap is configured to monitor a candidate U-Cell, the UE can be switched between the C-Cell and the U-Cell dynamically based on either CSI feedback or RRM feedback. In terms of signaling, multi-subframe or cross-subframe type scheduling can be used. For example, with cross-subframe scheduling, a DCI can schedule uplink or downlink in U-Cell in m msec, where m>4. That can be also combined with multi-subframe scheduling.

Notably, if any information is not given, the UE shall assume the information is same to that of the C-Cell for any the U-Cell configuration to minimize signaling overhead. When multiple U-Cells are configured, the parameters among different U-Cells may be assumed to be the same which is higher-layer indicated.

Since a UE is configured with a U-Cell, a U-RP can be configured using a special DCI similar to SPS activation PDCCH which the UE can detect with U-RNTI assigned to the UE. Alternatively, this DCI may be decoded with C-RNTI in this case additional field in the DCI to define a U-Cell index where a U-RP is being activated. DCI format for this may be based on DCI format 0 or format 1/1A as following Table 4. This DCI shall include the period of the U-RP where a UE is configured to monitor a U-Cell for. For TDD, a separate activation for uplink and downlink can be done by using DCI format 0 and DCI format 1A respectively or one (e.g., based on DCI format 1A) DCI activation may trigger both uplink and downlink U-RP.

TABLE 4

|  | DCI format 0 | DCI format 1/1A |
|---|---|---|
| TPC command for scheduled PUSCH | set to '00' | N/A |
| Cyclic shift DM RS | set to '000' | N/A |
| Modulation and coding scheme and redundancy version | MSB is set to '0' | N/A |
| Resource block assignment and hopping resource allocation | Set to '10's |  |
| HARQ process number | N/A | FDD: set to '000' TDD: set to '0000' |
| Modulation and coding scheme | Set to period P(0 = 1 radio frame, 1 = 2 radio frame, etc) (values which cannot be used with retransmission) | Set to period P(' 0 = 1 radio frame, 1 = 2 radio frame, etc (values which cannot be used with retransmission) |
| Redundancy version | N/A | set to '10' (or '01') |
| Resource block assignment | N/A | Set to all '10's (or other value other than '0's or '1's) |

The Table 4 is an example of special fields for U-RP Activation. For a period used with MCS field, the value for the period may be in between 10 msec to 1 second (or TBD) where those values are spread over MCS values [0 to 28] which are not used with retransmissions. Or the period may be transmitted using a new field.

Furthermore, data process is described as below. A UE shall assume that a U-RP starting at n+4th subframe is extended in to n+P (period)+4th subframe when U-RP activation DCI is received at n th subframe. When U-RP is activated or deactivated, in terms of UE behavior, it is similar to a SCell activation/deactivation. The UE shall flush HARQ buffer upon activation or deactivation of the U-RP. Otherwise, the UE shall assume SFN between a C-Cell and a U-Cell is aligned. Unless signaled otherwise, the UE shall assume TDD configuration between a C-Cell and a U-Cell is aligned. In this case, if the UE is configured to transmit A/N to a U-Cell while in the U-RP, aggregated A/Ns from the C-Cell before switch if any can be transmitted in the U-RP as well. Alternatively, a C-Cell and a U-Cell may divide HARQ processes disjointly so that UE does not have to flush HARQ buffer and A/Ns are handled separately for the C-Cell and the U-Cell separately. In other words, all the pending A/Ns from a C-Cell may be kept pending until the U-RP is deactivated or a UE needs to transmit uplink data to C-Cell. Similar thing can be applicable to a U-Cell as well. All the necessary configurations on a U-Plane may be configured when a UE is configured with U-Cell. Considering inter-site CoMP scenario where C-Cell and U-Cell may use the same frequency, a UE can be configured with different A/N configurations where HARQ-ACKs can be transmitted to each cell on downlink data received by each cell.

To support those features, multiple approaches can be feasible. Firstly, a separate A/N configuration per a set of HARQ-ACK process IDs can be applied, this approach may divide the HARQ processes in to multiple groups where different group have different HARQ-ACK configurations, the configuration includes power, scrambling sequence, A/N resource as example. Herein the A/Ns would be aggregated for the same group only in TDD. Except for the serving cell as the first HARQ-ACK configuration if multiple ones are configured, HARQ-ACK can be transmitted via PUSCH only thus HARQ-ACK is transmitted only when uplink scheduling is granted. Also, Associate CSI process with a set of HARQ-ACK process IDs can be applied, this approach divides HARQ processes into multiple CSI processes (TPs). For each CSI process, a separate HARQ-ACK configuration can be given. More, Utilize Cell ID information in PQI to decide A/N destination can be applied, this approach uses PQI to decide the target HARQ-ACK receiving-TP where HARQ-ACK for a downlink from a TP will be transmitted to the TP. Additional HARQ-ACK configuration per TP can be given.

Alternatively, all HARQ-ACK can be given to the serving cell (or a C-Cell) or transmitted to a TP which is higher-layer configured. If HARQ-ACK is configured to be transmitted via a C-Cell or to a TP, HARQ-ACK will be transmitted on subframes which are configured for the UE to monitor/transmit C-Cell or the TP.

If different TDD configurations are used between a C-Cell and a U-Cell, HARQ-ACK process for a C-Cell and a U-Cell would be independent. If this is the case, if switching occurs when a C-Cell is in downlink whereas a U-Cell is in uplink, the valid subframe starts from the first downlink subframe of the U-Cell. If not it can start at the subframe, it may reacquire synchronization.

Furthermore, this invention includes that PDCCH or ePDCCH may be used to dynamically select a C-Cell or a U-Cell for uplink transmission if uplink scheduling is used, or select a C-Cell or a U-Cell for downlink transmission if downlink scheduling is used. Whether the U-Cell or the C-Cell UE shall monitor can be higher-layer configured per each subframe. For example, if a subframe is configured for the U-Cell, the UE shall monitor all PDCCHs and PDSCHs in that subframe on the U-Cell. If the PDCCH schedules a PDSCH or PUSCH on the different cell, for example, in the C-Cell monitoring subframe, the PDCCH schedules a PDSCH in U-Cell, the UE shall assume the scheduling is cross-subframe scheduling such that the UE shall expect to receive PDSCH or transmit PUSCH using the assigned resource at the first subframe. Herein, the UE is configured to monitor different cell, for example, the first subframe in U-Cell in FDD if C-Cell monitoring subframe schedules a PDSCH in U-Cell. This can be indicated using PQI defined in Rel-11 or additional field. If there is no explicit indication, the UE shall assume PDSCH and PUSCH will be scheduled at the same cell. Furthermore, a separate EPDCCH set can be configured to monitor C-Cell and U-Cell respectively which can be configured by PQI table or configured separately. In this case, at a subframe level, a UE switches between C-Cell and U-Cell following EPDCCH monitoring subframe configuration per set.

This invention also includes that a toggle or additional indication can be used to switch between a C-Cell and a U-Cell if there is only one U-Cell similar to New Data Indicator. If it is toggled, the UE shall assume cell switch occurs and it becomes effective at 4 subframe afterwards. If there are more than one U-Cell configured, either only the lowest index of the U-Cell is used for switching or higher-layer configured to fix to one U-Cell. Or additional indication may be able to include cell index to explicitly notify the switching cell ID.

A UE may initiate the request to change C-Cell to U-Cell or vice versa or switch among U-Cells in this invention. Based on measurements and buffer status, a UE may request offloading to a U-Cell which can initiate U-RP activation or a dynamic indication or toggling to change the operating cell. The request may be sent to C-Cell either via regular PUCCH or RACH.

In terms of transmitting HARQ-ACK, a few options can be further considered when a UE is in a U-Cell. This invention includes that HARQ-ACK on a C-Cell data can be disable while UE is in U-Cell. The UE is not expected to transmit ACK/NACK for data received in C-Cell frequency while UE is in the U-Cell. In this case, the C-Cell may use extra coding or redundancy to improve the reception quality. Or this invention includes that ACK/NACK of C-Cell in U-Cell uplink can be transmitted. The UE can aggregate all the ACK/NACK and transmit to U-Cell. In this case, a separate (implicit or explicit) resource can be reserved for the C-Cell HARQ-ACK which may be inefficient in terms of resource utilization. Or, PUCCH format 3 is used, a few bits can be reserved for C-Cell ACK/NACK regardless of actual data transmission so that U-Cell can forward necessary ACK-NACK to C-Cell. For example, if PUCCH format3 can transmit 21 ACK/NACK bits, it is always assumed that it will have 21 bits and the last k bits are reserved for C-Cell such as k=4.

Another option when U-Cell is unlicensed band or secondary licensed band (i.e., primary users are not cellular UEs), if full-duplex mode operation is not supported, then instead of configuring TDD configuration in the U-Cell carrier, half-duplex FDD operation can be also assumed. In that case, HARQ-ACK timing will follow FDD operation (i.e., n+4 HARQ-ACK for downlink) which may simplifies the operation with some constraints in scheduling. If TDD is configured, a explicit TDD DL/UL configuration is configured. Otherwise, a UE may assume that half-duplex operation in that carrier where uplink frequency is the same as downlink frequency. Alternatively, a TDD DL/UL configuration may be given. Yet, HARQ-ACK timing may follow FDD timing with an assumption that scheduling will handle the conflict.

Related to the invention, a U-Cell Identification/Discovery/Synchronization Signal is described more. When a UE is activated with a U-RP, if a U-Cell is FDD or the first subframe of the U-RP is downlink in TDD, the UE may assume that a discovery signal is transmitted in the first subframe of the U-RP. If the first subframe of the U-RP is uplink, the UE may wait until the first downlink subframe or start uplink transmission with RACH where RACH resource and preamble index may be configured by higher-layer along with U-Cell configuration. The UE may assume that pre-determined location is used for discovery signal e.g., center 6RB or PRS based discovery or CRS based discovery, etc. Using the discovery signal, the UE verifies the U-Cell and perform tracking on time/frequency. For uplink TA, unless configured otherwise, the UE assumes TA=0 or same to the C-Cell's TA. If needed, a U-Cell may initiate PDCCH order to initiate RACH procedure. This invention provides that it is assumed that C-RNTI that the UE uses is not changed while in a U-RP. Upon deactivating the U-RP, a C-Cell may also transmit discovery signal for fast tracking on time/frequency.

FIG. 11 and FIG. 12 show an example of FDD Downlink Gap calculation which the present invention is applied.

Referring to FIG. 11, it shows that FDD Downlink Gap calculation that C-Cell assumes that UE not able to read C-Cell data. For FDD Downlink from C-Cell to U-Cell, a gap is set as to max {0, switching time+downlink propagation delay−subframe_offset}, where subframe_offset is the offset of subframe boundary between C-Cell and U-Cell and downlink propagation delay can be inferred from timing advance. It shall be reserved for the gap. The UE may assume that a few last symbols would not be used for downlink data upon activating the U-RP. For FDD Downlink from U-Cell to C-Cell, a gap is set to max {0, switching time−downlink propagation delay for the macro cell+subframe_offset}, wherein it assumes that downlink propagation delay can be inferred from timing advance to the macro cell. In other words, if timing advance is large enough, then additional gap may not be needed. This invention notes that the TA value is updated periodically from the macro cell with T interval if U-RP is long. This invention notes that a gap is handled by C-Cell. On the other hand, a few symbols of U-RP may be ignored instead. The gap calculation would be the same. That C-Cell assumes that UE is not able to read C-Cell data.

Referring to FIG. 12, it shows that FDD Uplink Gap calculation that C-Cell assumes that UE not able to read C-Cell data. For FDD Uplink from C-Cell to U-Cell, a gap is set as to max {0, switching time−uplink TAc/2−uplink TAu/2}−subframe_offset, herein, it assumes that TA to the U-Plane would be zero 0. If TA to U-Cell is not 0, the TA to U-Cell (uplink TAu) shall be extracted. In other words, if uplink TA is big enough i.e., covers switching time, then additional gap may not be assumed. For FDD Uplink from U-Cell to C-Cell, a gap is set as to switching time+uplink TAc/2+subframe_offset.

FIG. 13 shows an example of TDD handling which the present invention is applied.

Referring to FIG. 13, Activation of U-RP from downlink to downlink subframe may be defined by frequency switching time−downlink propagation delay. Activation of U-RP from downlink to uplink subframe may be defined by frequency switching time+D/U switching time−downlink propagation delay. Meanwhile, Activation of U-RP from uplink including special subframe to downlink subframe may be defined by max {0, frequency switching time+U/D switching time−downlink propagation delay (or TA/2)}. And Activation of U-RP from uplink including special subframe to uplink subframe may be defined by max {0, frequency switching time−downlink propagation delay (or TA/2)}.

For the reverse direction, the gap would be the following. De-activation of U-RP from downlink to downlink subframe may be set by max {0, downlink propagation delay−frequency switching time}. And De-activation of U-RP from downlink to uplink subframe may be considered by frequency switching time+D/U switching time+downlink propagation delay. Also, De-activation of U-RP from uplink including special subframe to downlink subframe may be set by max {0, frequency switching time+U/D switching time−downlink propagation delay (or TA/2)}. Furthermore, Deactivation of U-RP from uplink (including special subframe) to uplink subframe sets to max {0, frequency switching time+downlink propagation delay (or TA/2)}.

A Macro cell may configure a periodic C-Cell listening time where the UE shall listen to the Control-Plane-Cell instead of U-Cell. To minimize the impact of listening C-Cell while a UE is in a U-RP interval, the UE shall listen to C-Cell within a subframe where the necessary gaps are assumed within that subframe. To support this, a macro cell may not transmit any data in a last few OFDM symbols used for the gap or the UE may ignore the last few OFDM symbols used for the gap. Even when the UE is in the U-RP, the necessary downlink receptions are required such as SIB modification indication, paging subframes, SPS PDSCH, etc which cannot be avoided by not scheduling downlink via DCI. If the C-cell listening time is not defined or when the period may not be sufficient for time/frequency tracking on C-Plane, additionally C-Cell may transmit tracking/discovery signals upon the UE may return to the control cell from the U-Cell.

Similarly, when a UE is configured with a U-Cell, a periodic U-Cell listening time or a periodic U-Cell transmitting time, it can be configured for that the UE switches to the U-Cell and either listen or transmit data. If a UE performs D2D communication, this periodic U-Cell time configuration may be used for D2D communication or discovery. If a UE is configured with a bitmap where each bit indicates which cell UE should monitor, the UE may utilize subframes for U-Cell monitoring for D2D communication or public safety communication.

This invention further gives a detailed account of RRM Measurement. The RRM related configurations are set by C-Cell where the UE shall perform the configured RRM measurement even in a U-RP period. However, when UE switches from the C-Cell to the U-Cell, it shall suspend all CSI for the C-Cell and initiate CSI process on the U-Cell or vice versa when it returns to the C-Cell. For the subframes which are not used partially for the gap i.e., which UE cannot receive the full subframe, the UE may not assume those subframes as valid reference subframes for the CSI report purpose. While the UE is in a U-RP, the RRM measurement may be sent to the U-Cell or the C-Cell. If the RRM measurement is sent to the C-Cell, it shall use the configured RRM reporting period or the C-Cell may configure another RRM or CSI reporting period for the U-RP RRM reporting. Whenever the UE is deactivated from the U-RP, the UE shall report all the RRM measurement on the U-Cell to the C-Cell.

Meanwhile, RLF issue is the following, especially; a RLF on U-Plane is shown. When a UE is in the U-RP, in terms of RLF requirement, the UE shall perform the same requirement as if it is in DRX cycle. That is, it is set that no RLF measurement on the U-RP on the C-Cell when there is no data or the UE listens or transmits to U-Cell. While the U-RP, the UE shall perform RLF on the U-Cell separately where the RLF if occurs will be transmitted to the C-Cell. If the RLF occurs while the UE is in the U-RP, the UE may transmit a RACH to the C-Cell (similar to SR) so that the C-Cell can assign an uplink to the UE and the RLF report on the U-Cell is transmitted to the C-Cell. If the RLF is detected after the U-RP, it transmits the RLF via regular uplink report or piggybacked with CSI report or similar mechanism to a RLF on the C-Cell. Wherein, an additional indication/information of U-Cell identification for RLF notification may be required. When the C-Cell has received the RLF, it may de-configure the U-Cell or not activate the target U-Cell until signal quality becomes better. In summary, the RLF indication shall include target cell ID where the RLF occurs and the RLF on the U-Cell(s) would be sent to the C-Cell or the serving cell. Alternatively, radio link quality of the U-Cell may be totally dependent on RRM report on the U-Cell.

Thin invention also includes that UE Indication or capability indication is signaled. The UE may indicate the capability of supporting U-Cell and send the required switching time so that macro cell may be able to configure the U-Cell and a U-RP with a proper gap configuration. The UE may indicate the number of CSI processes that UE can support which may be used to decide how many U-Cells can be activated to the UE simultaneously.

Herein, this invention notes that, for FDD (and also for TDD), only downlink or uplink portion of a U-Cell may be configured to be used in a U-RP. In this case, uplink (e.g., A/N) and downlink may be still delivered by a C-Cell. In terms of HARQ-ACK procedure, the UE may follow A/N timing of the U-Cell within the U-RP. It may treat the C-Cell listening time if configured as non-usuable uplink or downlink And the UE follow A/N timing of the C-Cell if not in the U-RP. Alternatively, the A/N for the U-Cell may be aggregated and transmitted to the C-Cell upon deactivation of the U-RP or the HARQ-ACK process of the U-Cell may be ignored.

Furthermore, this invention may apply the techniques proposed to inter-site CoMP. Based on CSI process configuration or along with other information to identify site information or cell-related information, the similar techniques are applicable to inter-site CoMP as well. In that case, the U-Cell can be called as transmission point cell (TP-cell). Since in CoMP, TPs are operating with the same frequency band, the UE may not need frequency switching time for the gap. Moreover, the UE shall be able to support multiple CSI processes for CoMP TPs where RRM reports may be sent to C-Cell or serving cell altogether or separately per TP. Mechanisms to switch TPs can be similar to U-RP activation/deactivation as following. Trigger period where the UE can communicate with different TP from serving cell can be used to switch TPs. Also, a cross-subframe scheduling and dynamic DCI indication can be used so that the DCI dynamically can switch TPs. Or, using toggling/indication approach to change TP only upon request can be used.

For unlicensed band or secondary licensed band, the techniques proposed in this invention are applicable as well. When unlicensed band or secondary licensed band is used, the unlicensed band would be used as a U-cell tightly control by a C-Cell. The C-Cell and the U-Cell may be connected via ideal backhaul or can be intra-site. It provides is to perform data offloading using unlicensed or secondary licensed band where unlicensed band may not be used as a stand-alone carrier.

Differently from licensed band where a scheduling can be controlled by eNB, to utilize unlicensed band, the UE or the eNB shall compete with other users e.g., unlicensed band AP, station. Thus, there could be a delay to acquire the medium which may be larger than 4 msec. Thus, a UE may be configured with a delay i.e., an expected latency to be effective when a U-RP is activated. Moreover, there is a chance that medium acquisition fails, thus, when a UE enters the U-RP without receiving any data for more than a threshold, it shall trigger RLF i.e., return to the C-Cell. More specifically, this technique may be applicable even when the UE is in RRC_Idle for C-Cell and still UE is in active mode in U-Cell. In other words, RRC state may be maintained for each cell respectively.

Or, public-safety band can be applied with the techniques proposed in the invention. One approach to configure a UE with public-safety band is to assign a U-Cell with public-safety band such that UE can monitor the public-safety band regularly/irregularly.

FIG. 14 shows an exemplary flow chart according to an exemplary embodiment of the present invention.

Referring to FIG. 14, the UE can switch between C-Cell and U-Cell. For this, UE capability transfer procedure is used to transfer UE radio access capability information to switch between C-Cell and U-Cell, from the UE to serving cell. Wherein the serving cell includes one among a cell for the C-plane, a macro cell, a master cell, a reference cell, a primary cell, and a cell which is connected a radio resource control (RRC) connection to have the highest priority. And, the Change of the UE in RRC_IDLE is supported by use of Tracking Area Update. The capability information includes a capability of U-Cell with one or more frequencies for the U-Cell(s). Or, the A UE capable of switching U-Cell may initiate the procedure of RRC (re)configuration (1410). So the UE can configure one or more U-Cells.

When the UE needs or request to switch to a U-Cell based on measurements or buffer status, a request to switch to a U-Cell may be sent to a C-Cell either via regular PUCCH or RACH (1420) to the serving cell.

When the UE configures the C-Cell and one or more U-Cell(s), they can be configured with different TTD configurations. So the UE determines whether the switching to U-Cell is possible if C-Cell is in downlink and the U-Cell is in uplink, and determine valid start subframe considering the different TTD configurations (1430). Also this invention may include a predetermined rule about the switching time, for example, the UE can change to U-Cell with a high priority of the C-Cell configuration or, a high priority of the U-Cell at first. Or the UE can change to U-Cell with DRX configuration with a high priority of the C-Cell configuration or, a high priority of the U-Cell. This invention can include adapting to a new system s surroundings and a defined rule for the switching to U-Cell.

In this invention, the UE can also be indicated to change between C-Cell and U-Cell from the serving cell or C-Cell, or a control entity of a core network for data transmission. As example, the UE can receive and check PDCCH or ePDCCH to dynamically select C-Cell or U-Cell for uplink transmission (1440). A bit or an indication for the selection is signaled by a DCI via a PDCCH or ePDDCH. Or additional signaling or indication can be used in a PQI (PDCCH Rate Matching Quasi-collocation Index) to select one Cell with a new field in PQI table.

Alternatively, the UE can receive and determine a toggle or additional indication which can be used to switch between C-Cell and U-Cell with a NDI or a MAC signal/a RRC higher-layer signal such as SCell Activation or SCell configuration, herein the invention more includes that the UE send to request to switch between C-Cell and U-Cell, and it receives a response signal to allow a switch between C-Cell and U-Cell (1450).

Herein, one of these indicating steps as 1430, 1440, 1450 etc. for switching U-Cell can be used as a predetermined rule or manner with variable modification according to a communication system which this invention is applied. Thus, the UE may change to U-cell more efficient and rapidly when the downlink/uplink transmission is needed.

FIG. 15 is a block diagram showing a wireless communication system according to an embodiment of the present invention.

A BS 1550 includes a processor 1551, a memory 1052, and a radio frequency (RF) unit 1553. The memory 1552 is coupled to the processor 1551, and stores a variety of information for driving the processor 1551. The RF unit 1553 is coupled to the processor 1551, and transmits and/or receives a radio signal. The processor 1551 implements the proposed functions, procedures, and/or methods. In the embodiments of FIG. 6 to FIG. 14, the operation of the BS can be implemented by the processor 1551.

Especially, the processor 1551 may configure one or more cells with different frequencies, for this invention the processor 1551 configures a cell for the U-plane to receive and transmit data with a wireless device, and determines to enable a User Plane Reception Period (U-RP) corresponding to the cell for the U-plane to receive and transmit data with the cell for the U-plane during the enabled U-RP, wherein the cell for the U-plane includes at least one or more serving cells, and the cell for the U-plane has a different frequency from a cell for the C-plane.

For this, the processor 1551 may configure to attach procedure to the cell for the U-plane via a hand-over procedure, to set a Discontinuous Reception (DRX) configuration to listen frequency for the cell for the U-plane, or to configure an inter-frequency measurement gap to monitor a candidate cell for the cell for the U-plane. The Discontinuous Reception (DRX) configuration includes at least one of duration of DRX-Period which is longer than a regular DRX duration and an Inactivity timer for the DRX-Period which is different values from the regular DRX Inactivity timer.

Also the processor 1551 may configure an indication to enable the U-RP of the cell for the U-plane, which is set by one among a bit to indicate the U-RP enabling or disabling with reserved bit in a physical downlink control channel (PDCCH) or an enhanced PDCCH (ePDCCH), a signal using a Medium Access Control (MAC) signal associated with a activation/deactivation for the cell for the U-plane, and a RRC signal with Discontinuous Reception (DRX) configuration. Herein the U-RP is included in a Downlink Control Information (DCI) format 0 or DCI format 1/1A, with a Modulation and coding scheme (MCS) field. In this invention, the processor 1551 may provide a switching time, a downlink propagation delay, and subframe_offset, and wherein the downlink propagation delay includes a value for timing advance (TA) to the wireless device.

The wireless device 1560 includes a processor 1561, a memory 1562, and an RF unit 1563. The memory 1562 is coupled to the processor 1561, and stores a variety of information for driving the processor 1561. The RF unit 1563 is coupled to the processor 1561, and transmits and/or receives a radio signal. The processor 1561 implements the proposed functions, procedures, and/or methods. In the embodiments of the FIG. 6 to FIG. 14, the operation of the UE can be implemented by the processor 1561.

Especially, Especially, the processor 1561 may configure one or more cells with different frequencies, for this invention the processor 1561 configures a cell for the U-plane to receive and transmit data, and determines to enable a User Plane Reception Period (U-RP) corresponding to the cell for the U-plane to receive and transmit data with the cell for the U-plane during the enabled U-RP, wherein the cell for the U-plane includes at least one or more serving cells, and the cell for the U-plane has a different frequency from a cell for the C-plane. To configure one or more cells, the processor 1561 may indicate a capability with one or more frequencies for the U-plane to a serving cell, and require switching between a cell for the C-plane and a cell for the U-plane.

For this, the processor 1561 may configure to attach procedure to the cell for the U-plane via a hand-over procedure, to set a Discontinuous Reception (DRX) configuration to hear/listen frequency for the cell for the U-plane, or to configure an inter-frequency measurement gap to monitor a candidate cell for the cell for the U-plane. The Discontinuous Reception (DRX) configuration includes at least one of duration of DRX-Period which is longer than a regular DRX duration and an Inactivity timer for the DRX-Period which is different values from the regular DRX Inactivity timer.

Also the processor 1561 may receive and determine an indication to enable the U-RP of the cell for the U-plane, which is set by one among a bit to indicate the U-RP enabling or disabling with reserved bit in a physical downlink control channel (PDCCH) or an enhanced PDCCH (ePDCCH), a signal using a Medium Access Control (MAC) signal associated with a activation/deactivation for the cell for the U-plane, and a RRC signal with Discontinuous Reception (DRX) configuration. Herein the U-RP is included in a Downlink Control Information (DCI) format 0 or DCI format 1/1A, with a Modulation and coding scheme (MCS) field. Furthermore, the processor 1561 may determine one of that different configuration for the cells of the C-plane and a cell for the U-plane each is configured, a dynamic selection is indicated, and a toggle or indication for switching is used, wherein the cell for the U-plane includes at least one or more serving cells, and the cell for the U-plane has a different frequency from the cell for the C-plane.

In this invention, the processor 1561 may further calculate a gap for an unreadable region between a cell for C-plane and a cell for U-plane using at least one of a switching time, a downlink propagation delay, and subframe_offset, and wherein the downlink propagation delay includes a value for timing advance (TA). To calculate the gap, the above information can be received with additionally.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for supporting a control plane (C-plane) and a user plane (U-plane) in a wireless communication system supporting multiple carriers, performed by a wireless device, the method comprising:
   setting up a cell for the U-plane, the cell for the U-plane including at least one serving cell (SCell);
   determining whether a User Plane Reception Period (U-RP) corresponding to the cell for the U-plane is enabled;
   receiving a paging from a cell for the C-plane or a cell of an anchor carrier during the enabled U-RP; and
   communicating with the cell for the U-plane during the enabled U-RP when it is determined that the U-RP is enabled.

2. The method of claim 1, wherein the cell for the U-plane is configured by performing one of a hand-over procedure, an SCell configuration, an activation of an SCell procedure, and a deactivation of the SCell procedure.

3. The method of claim 1, further comprising:
   setting up a Discontinuous Reception (DRX) configuration to listen to a frequency for the cell for the U-plane,
   wherein the DRX configuration includes a first DRX period, a second DRX period, a first Inactivity timer value, and a second Inactivity timer value, the first DRX period being longer than the second DRX period, and the first Inactivity timer value being different from the second Inactivity timer value.

4. The method of claim 1, further comprising:
   reporting measurement results to a cell for the C-plane,
   wherein the cell for the C-plane includes at least one of the cell for the anchor carrier, a macro cell, a master cell, a reference cell, a primary cell, and a cell which is connected a radio resource control (RRC) connection to have the highest priority.

5. The method of claim 1, further comprising:
   setting up the cell of the anchor carrier, and setting up a cell of a dependent carrier that is dependent on the anchor carrier, wherein the anchor carrier and the dependent carrier are supporting a U-Plane functionality.

6. The method of claim 1, further comprising:
   receiving an indication including whether the U-RP of the cell for the U-plane is enabled,
   wherein it is determined that the U-RP is enabled based on the indication, wherein the indication is received via one of a physical control channel, a medium access control (MAC) message associated with a activation/deactivation for the cell for the U-plane, and a radio resource control (RRC) message associated with the Discontinuous Reception (DRX) configuration, and
   wherein the indication includes a flag bit that is set to a first value when the U-RP is enabled and is set to a second value when the U-RP is not enabled.

7. The method of claim 1, wherein the U-RP is included in a Downlink Control Information (DCI) format 0 or DCI format 1/1A, and a value of the U-RP is set with a Modulation and Coding Scheme (MCS) field.

8. The method of claim 1, further comprising:
   calculating a gap for an unreadable region between the cell for the C-plane and the cell for the U-plane using at least one of a switching time, a downlink propagation delay, and a subframe offset,
   wherein the downlink propagation delay includes a value for a timing advance (TA).

9. A wireless device configured for supporting a control plane (C-plane) and a user plane (U-plane) in a wireless communication system supporting multiple carriers, the wireless device comprising:
   a radio frequency unit configured to receive and transmit a radio signal; and
   a processor operatively coupled with the radio frequency unit and configured to:
   set up a cell for the U-plane, the cell for the U-plane including at least one serving cell (SCell);
   determine whether a User Plane Reception Period (U-RP) corresponding to the cell for the U-plane is enabled;
   receive a paging from a cell for the C-plane or a cell of an anchor carrier during the enabled U-RP; and
   communicate with the cell for the U-plane during the enabled U-RP when it is determined that the U-RP is enabled.

10. The wireless device of claim 9, wherein the cell for the U-plane is configured by performing one of a hand-over procedure, an SCell configuration, an activation of an SCell procedure, and a deactivation of the SCell procedure.

11. The wireless device of claim 9, wherein the processor is further configured to:
set up a Discontinuous Reception (DRX) configuration to listen to a frequency for the cell for the U-plane,
wherein the DRX configuration includes a first DRX period, a second DRX period, a first Inactivity timer value, and a second Inactivity timer value, the first DRX period being longer than the second DRX period, and the first Inactivity timer value being different from the second Inactivity timer value.

12. The wireless device of claim 9, wherein the processor is further configured to:
set up the cell of the anchor carrier, and a cell of a dependent carrier that is dependent on the anchor carrier,
wherein the anchor carrier and the dependent carrier are supporting a U-Plane functionality.

13. The wireless device of claim 9, wherein the processor is further configured to:
indicate a capability with one or more frequencies for the U-plane to an SCell, and determine one of that a different configuration for each of the cells is configured, a dynamic selection is indicated, and a toggle or indication for switching is used.

14. A method for supporting a control plane (C-plane) and a user plane (U-plane) in a wireless communication system supporting multiple carriers, performed by a wireless device, the method comprising:
indicating a capability with one or more frequencies for the U-plane to a serving cell,
requesting to switch between a cell for the C-plane and a cell for the U-plane, and
determining one of that a different configuration for each of the cells is configured, a dynamic selection is indicated, and a toggle or indication for switching is used,
wherein the cell for the U-plane includes at least one or more serving cells, and the cell for the U-plane has a different frequency from the cell for the C-plane.

* * * * *